United States Patent [19]

Yamashita et al.

[11] 3,786,254

[45] Jan. 15, 1974

[54] THERMOLUMINESCENCE DOSIMETER HAVING A HANDLE

[75] Inventors: Tadaoki Yamashita; Osamu Yamamoto, both of Hirakata; Hajimu Oonishi, Neyagawa; Hidetsugu Kawabata, Kobe; Saburo Kitamura, Kyoto, all of Japan

[73] Assignee: Matsushita Electric Industrial Co., Ltd., Osaka, Japan

[22] Filed: Dec. 20, 1971

[21] Appl. No.: 210,097

Related U.S. Application Data

[63] Continuation of Ser. No. 12,238, Feb. 18, 1970, abandoned.

[30] Foreign Application Priority Data

| | | |
|---|---|---|
| Feb. 26, 1969 | Japan | 44/17908 |
| Feb. 26, 1969 | Japan | 44/17909 |
| Feb. 26, 1969 | Japan | 44/17910 |
| Feb. 26, 1969 | Japan | 44/17911 |

[52] U.S. Cl. .......... 250/71 R, 250/83 R, 250/83 CD
[51] Int. Cl. .......... G01t 1/11
[58] Field of Search .......... 250/71 R, 71.5 R, 250/83 R, 83 CD, 108 R

[56] References Cited

UNITED STATES PATENTS

| | | | |
|---|---|---|---|
| 3,141,973 | 7/1964 | Heins et al. | 250/71 R |
| 3,229,097 | 1/1966 | Durkee et al. | 250/108 R |
| 3,371,209 | 2/1968 | Rutland et al. | 250/83 R |

*Primary Examiner*—Archie R. Borchelt
*Attorney*—Stevens, Davis, Miller & Mosher

[57] ABSTRACT

A thermoluminescence dosimeter is integrated with a dosimeter-holding member to simplify and assure its handling as well as to prevent the generation of miscellaneous luminescences, for example, a luminescence due to the heat of friction. The reliability of the thermoluminescence dosimeter is thereby greatly improved in measuring dose.

3 Claims, 15 Drawing Figures

T. YAMASHITA, O. YAMAMOTO,
H. OONISHI, H. KAWABATA AND
S. KITAMURA INVENTORS

BY Stevens, Davis, Miller & Mosher
ATTORNEYS

INVENTOR

BY

ATTORNEY

INVENTOR

BY

ATTORNEY

THERMOLUMINESCENCE DOSIMETER HAVING A HANDLE

This is a continuation of application, Ser. No. 12,238, filed Feb. 18, 1970, now abandoned.

This invention relates to a thermoluminescence dosimeter.

It is an object of the present invention to provide a structure of a dosimeter whose reliability for measuring a dose is improved, and whose handling is much simplified and reliable.

The thermoluminescence dosimeter has beter sensibility and accuracy for measurement of a radiation dose than has a film badge or the like, and is therefore increasingly employed by operators working in atomic power facilities or for radiation control in such facilities.

In the field of radiation control, the most desirable properties for the dosimeter are a reliability and a simplicity in handling.

However, the thermoluminescence dosimeters in the following forms have been heretofore employed: (1) crystals, (2) crystal powders, (3) powders sealed in a glass ampule, and (4) powders dispersed in a resin. These dosimeters have had inconvenience and unreliability in handling: for example, (a) tweezers are always necessary for use in the handling, (b) it is not an easy matter to identify each dosimeter, (c) miscellaneous luminescence is generated when the dosimeter is held by hand, and (d) a tribo-thermoluminescence is generated due to friction between the dosimeter and a case when the dosimeter is employed together with the case. This inconvenience and unreliability have constituted practical problems when thermoluminescence dosimeters are employed in the radiation monitoring.

In the present invention, such a problem can be eliminated by providing a holding member connected to the thermoluminescence-generating section, for example, a handle, whereby a dosimeter, which is simple in structure and secure in handling, can be provided.

Figures 1A, 1B, 1C:
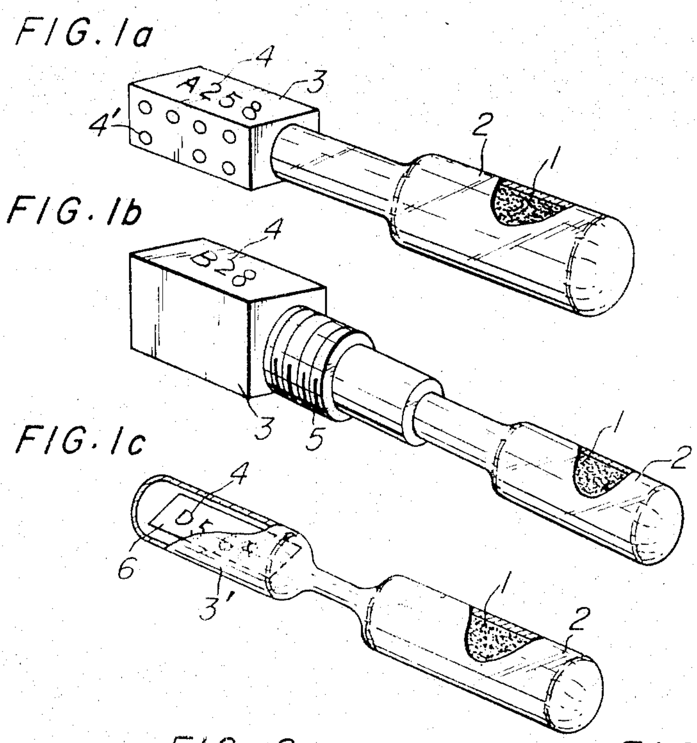

Now, the structure of the present dosimeter will be explained, with reference to the accompanying drawings:

FIG. 1*a*, 1*b* and 1*c* show the structures of the dosimeters wherein powders of thermoluminescent material are sealed in a glass ampule.

FIGS. 2*a*, 2*b*, 3*a* and 3*b* show embodiments of a glass ampule-type dosimeter and a crystal-type dosimeter.

Figure 4:
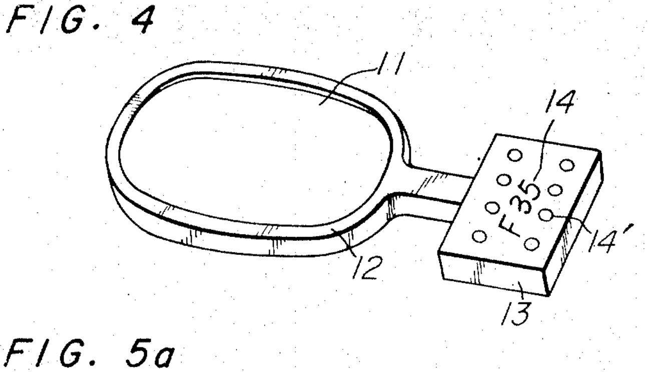

FIG. 4 shows a structure of a dosimeter wherein a disc-shaped thermoluminescent material is provided with a handle.

Figure 5A:
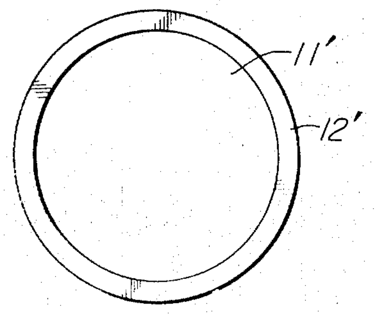
Figure 5B:
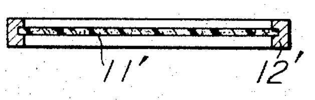

FIGS. 5*a* and 5*b* show a structure similar to that of the disc-shaped dosimeter as shown in FIG. 4.

Figure 6:
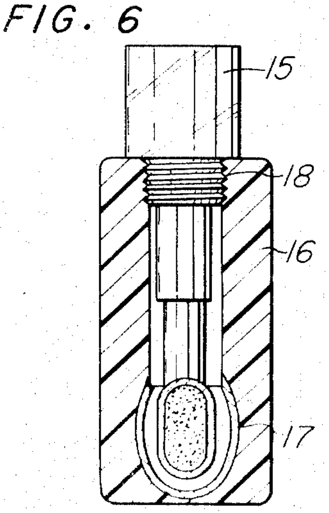

FIG. 6 shows a dosimeter case for the glass ampule-type dosimeter having a thread cut at at the handle part.

Figure 7:
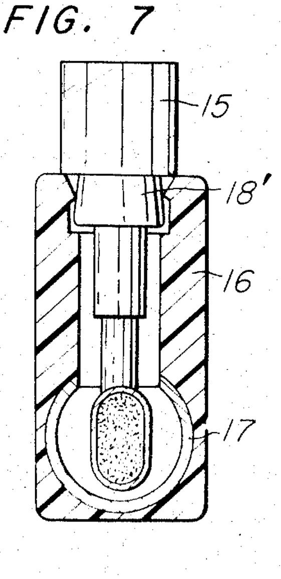

FIG. 7 also shows a dosimeter case as in FIG. 6.

Figure 8:
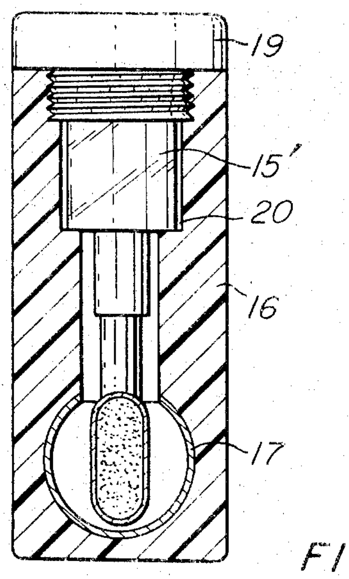

FIG. 8 shows another embodiment of a dosimeter case as shown in FIGS. 6 and 7.

Figure 9A:
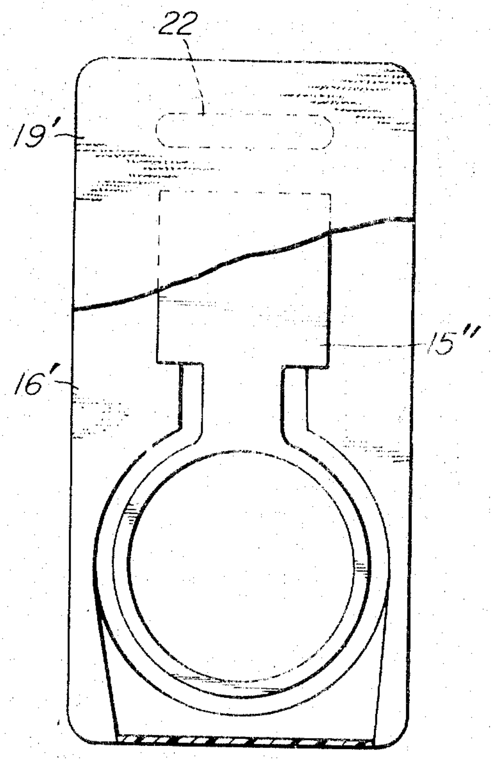
Figure 9B:
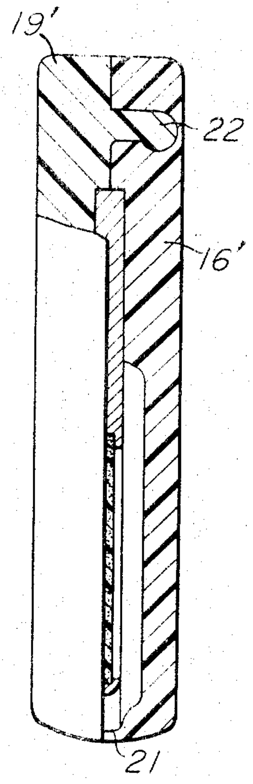

FIGS. 9*a* and 9*b* show a disc-shaped dosimeter and its case.

In FIG. 1*a*, numeral 1 is a thermoluminescent material, for example, lithium fluoride (LiF), calcium fluoride ($CaF_2$), calcium sulfate ($CaSO_4$:Mn, $CaSO_4$:Tm, $CaSO_4$:Dy), lithium borate ($Li_2B_4O_7$) or beryllium oxide (BeO). Numeral 2 is a glass ampule for enclosing the thermoluminescent material. Numeral 3 is an aluminum handle for facilitating the handling of the dosimeter. Numeral 4 are letters imprinted on the handle to identify each dosimeter. Numeral 4' are small holes which are cut as marks corresponding to the letters. The letters can be imprinted by the user, when required.

In FIGS. 1*b* and 1*c*, the numerals have the same meanings as defined in FIG. 1*a*, except for the following additional numerals. Numeral 5 is a thread cut on the aluminum handle 3 to secure the dosimeter to the dosimeter case. Numeral 3' is a handle integrated with a part of the glass ampule, and numeral 6 is a metal plate on which the letters 4 are imprinted to identify the dosimeter. The metal plate is sealed into a glass tube, which constitutes a handle.

Figure 2A:
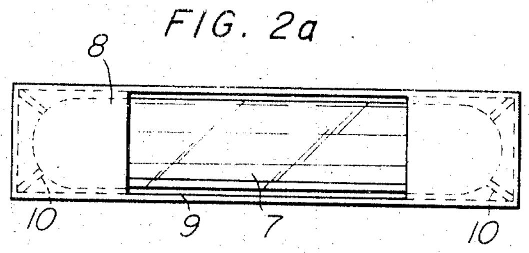
Figure 2B:
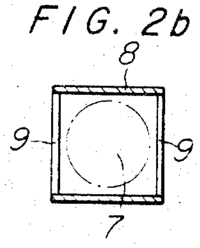

In FIGS. 2*a* and 2*b*, numeral 7 is a glass ampule in which the thermoluminescent material is sealed, and numeral 8 is a metal box, to both ends of which the glass ampule is fixed. Windows 9 are provided on both sides of the metal box to obtain the thermoluminescence. Numeral 10 are spring plates for fixing the glass ampule to the metal box. The dosimeter can be handled by picking up the metal box. When the glass ampule is picked up by hand, miscellaneous luminescences, for example, luminescence due to the heat of friction and luminescence due to surface change of the glass, are emitted from the glass, and are liable to bring about errors in measuring a dose and decrease the reliability.

If the structure of the dosimeter is as described above, the dosimeter is inevitably handled only by picking up the metal box, and the fear of generating miscellaneous luminescence is thereby diminished and also the handling is simultaneously made more convenient. Letters or numbers can be imprinted or marked on the metal box to identify the dosimeter.

Figure 3A:
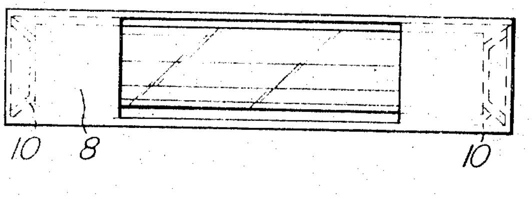
Figure 3B:
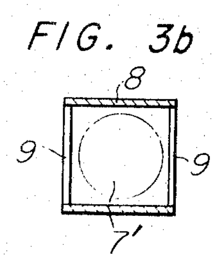

In FIGS. 3*a* and 3*b*, numeral 7' is a rod made from thermoluminescent crystals or a rod-shaped thermoluminescent material prepared by shaping the thermoluminescent material powders into a rod by means of a resin. Numeral 8 is a metal box, which serves as a handle, and numeral 10 represents springs for fixing the rod into the metal box.

In FIG. 4, numeral 11 is a disc of thermoluminsescent material prepared by shaping the material into a disc by means of a resin or an inorganic binder. Numeral 12 is an aluminum frame for holding the thermoluminescent disc, and numeral 13 is a handle integrated with the frame 12. Numeral 14 are letters or numbers imprinted on the handle and 14' are small holes cut in correspondence to the numbers.

In FIGS. 5*a* and 5*b*, numeral 11' is a disc film of such thermoluminescent material as calcium sulfate, lithium fluoride, or calcium fluoride, prepared by shaping such thermoluminescent material in a disc by means of a polyimideamide resin or polyethylene tetrafluoride. Numeral 12 is an aluminum ring for fixing the circumference of the disc film. The dosimeter can be handled not by directly picking up the thermoluminescence film, but by picking up the aluminum ring. The letters or numbers can be imprinted on the aluminum ring.

In the foregoing, the structure of a dosimeter having a handle convenient for handling has been explained.

Now, the dosimeter case, which is applicable to the dosimeter, will be explained hereunder.

In FIG. 6, a dosimeter case applicable to the glass ampule dosimeter having a thread cut at the handle as shown in FIG. 1b is shown. The dosimeter is inserted in the case and carried by an operator or located in the radiation facility. Numeral 15 is a glass ampule dosimeter have a thread-cut handle, and numeral 16 is a dosimeter case made from a resin. Numeral 17 is a radiation shield made from tin or cadmium metal, which is shaped into a spherical shell or an elliptical shell. The shell has a large number of small perforations to adjust the difference in sensibility of the dosimeter due to the radiation energy. Such perforations are especially necessary when calcium sulfate or calcium fluoride is used as the thermoluminescent material. In the present invention, the special spherically shaped dosimeter is a feature of the embodiment, because the spherical shape can eliminate the angular dependence in radiation sensitivity. Numeral 18 is a screw-threaded part which is important in the present invention. For the aluminum dosimeter handle, a male thread is cut, and for the resin dosimeter case, a female thread is cut. The dosimeter is fixed by means of the threaded part, whereby the glass part of the thermoluminescence-generating section can be kept away from contact with other materials. Such a structure is one of the features of the present invention. In conventional thermoluminescence dosimeters, a mechanical force is applied to the thermoluminescence-generating part. When the thermoluminescence-generating part undergoes mechanical friction, a luminescence due to the heat of friction is developed and turns to a dummy signal upon the measurement of the dose. As a result, the reliability of the dosimeter is decreased. In the present invention, such trouble is eliminated by providing a structure in which no mechanical friction is developed. Thus, the reliability of the dosimeter is greatly increased in the present invention.

In FIG. 7, numeral 15 is a glass ampule-type dosimeter, 16 is a dosimeter case, 17 is a radiation shield, 18' is a projection provided on the dosimeter case. The dosimeter can be fixed to the dosimeter case by the projection and a taper part formed in the handle part of the dosimeter.

In FIG. 8, numeral 15' is a glass ampule-type of dosimeter having no thread cut, as shown in FIG. 1*a*, numeral 16 is a dosimeter case, 17 is a radiation shield, 19 is a lid for the dosimeter case. In that case, the dosimeter is of such a structure that the handle part is placed on an expanded part 20 of the dosimeter case and the dosimeter is fixed by pressing the handle part to the expanded part of the case by means of the lid.

In FIGS. 9*a* and 9*b*, numeral 15'' is a dosimeter shown in FIG. 4, 16' is a dosimeter case made from a resin, 19' is a lid for the dosimeter case. The case and the lid are connected to each other by means of a hinge 21. Numeral 22 is a projection for securing the lid. In the conventional disc-shaped dosimeter, the thermoluminescence dosimeter itself is fixed to the dosimeter case. On the other hand, in the structure of the present invention, the thermoluminescence part of the disc-shaped dosimeter is fixed by pressing the handle part to the case 16' by means of the lid 19' without any contact of the thermoluminescence part with the dosimeter case. No luminescence due to the heat of friction is generated in such a structure and the reliability is thereby increased.

In the present invention, the handling of the dosimeter is made convenient by the arrangement of the dosimeter and the dosimeter case, as explained above, and the reliability of the present dosimeter can be much improved due to the structure for preventing the generation of miscellaneous luminescence.

That is to say, it is made possible to pick up the dosimeter by means of a handle attached to the dosimeter. The conventional dosimeter is always handled with tweezers, because it is small in size and to prevent the generation of miscellaneous luminescence. When the conventional dosimeter is handled with fingers, there always develops a great error.

Furthermore, it is impossible in the conventional dosimeter to imprint numbers or letters on the dosimeter itself, and no imprinting has been effected. In the dosimeter of the present invention, it is possible to imprint numbers or letters on the handle, and thereby to identify each dosimeter. Such a means is very effective for radiation control. Particularly, when a large number of dosimeters are handled, there is no fear of mistaking the relevant dosimeter.

Another great merit of the present invention is an improvement in the reliability of the dosimeter. In the conventional dosimeter, the reliability is greatly reduced due to the generation from the dosimeter of the luminescence due to the heat of friction. In the present invention, on the other hand, the dosimeter is provided with a handle, and the handle is fixed to the dosimeter case. Luminescence due to the heat of friction can be almost completely prevented in the present invention.

When a disc-shaped dosimeter having a diameter of 13 mm, which is prepared by shaping lithium fluoride into a disc by means of polyethylene tetrafluoride and has a sensibility of 10 milli-roentogen, is inserted into the conventional dosimeter case and carried on the human body for one month, a luminescence due to the heat of friction corresponding to an average 80 milli-roentogen is observed, but when the same dosimeter is made into a structure having a handle, as shown in FIG. 4, inserted in the dosimeter case as shown in FIG. 8 and carried on a human body for one month, only luminescence due to the heat of friction corresponding to 10 milli-roentogen is observed. In this manner, the reliability can be much improved by an arrangement of the dosimeter and the dosimeter case of the present invention.

In the foregoing, the structure of the present thermoluminescence dosimeter has been explained in detail. Though the present invention is based on a structure of a dosimeter and a handle attached thereto, the importance of such an idea is seen only in the dosimeter alone, but also in a close relation to a structure of a thermoluminescence readout instrument for reading a dose of the dosimeter. That is to say, it is related to a system for heating the dosimeter.

According to the heretofore widely utilized heating system, a dosimeter is placed on a heater consisting of an electro-resistance metal plate, and the heater is heated by passing a large quantity of electric current through the metal plate heater. The dosimeter is heated by the heat transfer from the metal plate. In the conventional system, the provision of a holding member such as a handle or a frame to the dosimeter makes the heating difficult and has never been attempted.

In a special heating system, an integral structure of the dosimeter with an heater of electric resistor is available. That is, in such a structure, an electrode is fixed to the dosimeter. In that case, the structure is somewhat larger and a little easier to pick up, but such is solely destined as an electrode structure and is not designed for picking up.

The present dosimeter provided with a handle is directed to a readout instrument of a blowing heated air system, an induction heating system or a light heating system, and is not applicable to a readout instrument of an electric resistance heating system. Said readout instruments of a blowing heating air system, an induction heating system and a light heating system have been invented by the present inventors. It is added that the present invention is closely related to a mechanism of these readout instruments.

What we claim is:

1. A thermoluminescence dosimeter of an external heating type for measuring a dose comprising:

an elongated glass member having a hermetically sealed hollow cylindrical end portion and an elongated opposite end portion of reduced diameter with respect to said sealed cylindrical end portion;

a thermoluminescent material filling said hollow cylindrical end portion and adapted to be heated externally for reading a dose, and a handling member integrally fixed to said glass member at said end opposite to said cylindrical end portion, said handling member being substantially thermally isolated from said thermoluminescent material and being adapted to be handled directly by hand and to be marked for identification.

2. A thermoluminescence dosimeter of an external heating type for measuring a dose comprising:

a disc-shaped thermoluminescent element made of a thermoluminescent material and shaped with a resin binder and adapted to be heated externally for reading a dose;

a frame member having a frame portion for holding said thermoluminescent element and a projected portion extended outwardly from said frame portion, and a handling member integrally fixed to the end of said projected portion of said frame member, said handling member being substantially thermally isolated from said thermoluminescent material and being adapted to be handled directly by hand and to be marked for identification.

3. A dosimetry system for measuring a radiation dose, comprising:

an elongated glass member having a hermetically sealed hollow cylindrical end portion and an elongated opposite end portion of reduced diameter with respect to said sealed cylindrical end portion;

a thermoluminescent material filling said hollow cylindrical end portion and adapted to be heated externally for reading a dose;

a handling member integrally fixed to said glass member at said end opposite to said cylindrical end portion, said handling member being substantially thermally isolated from said thermoluminescent material and being adapted to be handled directly by hand and to be marked for identification;

a dosimeter case having an opening therein and an internal space in communication with said opening; and a radiation shield having a predetermined number of perforations lining the walls of said internal space;

said thermoluminescence dosimeter being detachably inserted into said dosimeter case such that said sealed cylindrical end portion of said glass member is disposed in said internal space in spaced relation to said shield, and said handling member being detachably secured to said opening.

* * * * *